(12) United States Patent
Bradford et al.

(10) Patent No.: US 7,113,943 B2
(45) Date of Patent: Sep. 26, 2006

(54) METHOD FOR DOCUMENT COMPARISON AND SELECTION

(75) Inventors: Roger Burrowes Bradford, Great Falls, VA (US); Janusz Wnek, Germantown, MD (US)

(73) Assignee: Content Analyst Company, LLC, Reston, VA (US)

( * ) Notice: Subject to any disclaimer, the term of this patent is extended or adjusted under 35 U.S.C. 154(b) by 560 days.

(21) Appl. No.: 09/683,263

(22) Filed: Dec. 5, 2001

(65) Prior Publication Data

US 2002/0103799 A1 Aug. 1, 2002

Related U.S. Application Data

(60) Provisional application No. 60/251,423, filed on Dec. 6, 2000.

(51) Int. Cl.
*G06F 17/30* (2006.01)
(52) U.S. Cl. .................... 707/4; 707/5; 707/6
(58) Field of Classification Search .......... 707/1–10, 707/100, 200, 103; 705/26; 704/9
See application file for complete search history.

(56) References Cited

U.S. PATENT DOCUMENTS

| | | | | |
|---|---|---|---|---|
| 4,893,853 | A | | 1/1990 | Guiler ................ 292/320 |
| 5,301,109 | A | | 4/1994 | Landauer et al. ...... 364/419.19 |
| 5,926,812 | A | | 7/1999 | Hilsenrath et al. ........... 707/5 |
| 6,041,323 | A | | 3/2000 | Kubota ................... 707/5 |
| 6,263,335 | B1 | * | 7/2001 | Paik et al. ............... 707/5 |
| 6,347,314 | B1 | * | 2/2002 | Chidlovskii ............. 707/3 |
| 6,349,309 | B1 | * | 2/2002 | Aggarwal et al. .......... 707/200 |
| 6,519,586 | B1 | * | 2/2003 | Anick et al. ............. 707/3 |
| 6,678,679 | B1 | * | 1/2004 | Bradford ............... 707/5 |
| 2002/0059161 | A1 | * | 5/2002 | Li ..................... 707/1 |
| 2002/0107853 | A1 | * | 8/2002 | Hofmann et al. .......... 707/7 |
| 2003/0088480 | A1 | * | 5/2003 | Berghofer et al. .......... 705/26 |

OTHER PUBLICATIONS

Nello Cristianini, John Shawe-Taylor, Huma Lodhi. Latent Semantic Kernels. Kluwer Academic Publishers. (retrieved by Google Scholar on Nov. 24, 2005).*
A.M. Roumani & D.B. Skillicorn. Large-Scale Resource Selection in Grids. School of Computing, Queen's University, Kingston, Canada. (retrieved by Google Scholar on Nov. 24, 2005).*
Sergey Brin. Extracting Patterns and Relations from the World Wide Web. Computer Science Dep. Stanford University. (retrieved by Google Scholar on Nov. 24, 2005).*
Korfhage, R., "Information Storage and Retrieval", Section 5.7, Document Similarity, pp. 125-133, Wiley and Sons, 1997.
Landuer, T., et al., "An Introduction to Latent Semantic Analysis, Discourse Processes", vol. 25, 1998, pp. 259-284.
Deerwester, S., et al, "Indexing by Latent Semantic Analysis, Journal of the Society for Information Science", 41(6), pp. 391-407, Oct. 1990. Available at website: http://lsi.argreenhouse.com/~remde/lsi/papers/JASIS90.pdf.

(Continued)

*Primary Examiner*—Jeffrey Gaffin
*Assistant Examiner*—Neveen Abel-Jalil
(74) *Attorney, Agent, or Firm*—Sterne, Kessler, Goldstein & Fox P.L.L.C.

(57) ABSTRACT

Extensions to latent semantic indexing (LSI), including: phrase processing, creation of generalized entities, elaboration of entities, replacement of idiomatic expressions, and use of data fusion methods to combine the aforementioned extensions in a synergistic fashion. Additionally, novel methods tailored to specific applications of LSI are disclosed.

13 Claims, 4 Drawing Sheets

OTHER PUBLICATIONS

Ding, C., "A Similarity-based Probability Model for Latent Semantic Indexing", Proceedings of the 22$^{nd}$ Annual SIGIR Conference, Berkeley, CA, Aug. 1999.

Dumais, S., "LSI meets TREC: A Status Report", in: D. Harman (Ed.), The First Text Retrieval Conference (TREC1), National Institute of Standards and Technology Special Publication #500-207, 1993, pp. 137-152. Available at website: http://lsi.argreenhouse.com/~remde/lsi/LSIpapers.html.

Dumais, S., "Latent Semantic Indexing (LSI) and TREC-2", in D. Harman (Ed.), The Second Text REtrieval Conference (TREC2), National Institute of Standards and Technology Special Publication #500-215, 1994, pp. 105-116. Available at website: http://lsi.argreenhouse.com/~remde/lsi/LSIpapers.html.

Dumais, S., "Latent Semantic Indexing (LSI): TREC-3 Report", in: D. Harman (Ed.), The Third Text REtrieval Conference (TREC3), National Institute of Standards and Technology Special Publication #500-226, 1995. Available at website: http://lsi.argreenhouse.com/~remde/lsi/LSIpapers.html.

Dumais, S., et al., "Automatic Cross-language Retrieval Using Latent Semantic Indexing", in AAAI Spring Symposium on Cross-Language Text and Speech Retrieval, Mar. 1997.

* cited by examiner

|  | Doc #1 | Doc #2 | ... | Doc #n |
|---|---|---|---|---|
| able | 1 | 0 | ... | 1 |
| acid | 0 | 2 | ... | 0 |
| ... | ... | ... | ... | ... |
| <term m> | 1 | 0 |  | 1 |

FIGURE 1 Term by Document Matrix

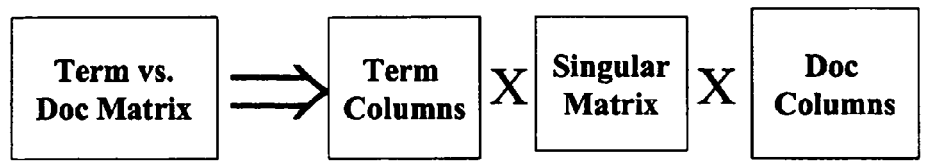
SVD Extracts Key Relationships among Terms - Basis for Conceptual Matching
FIGURE 2 – Singular Value Decomposition (SVD) Operation

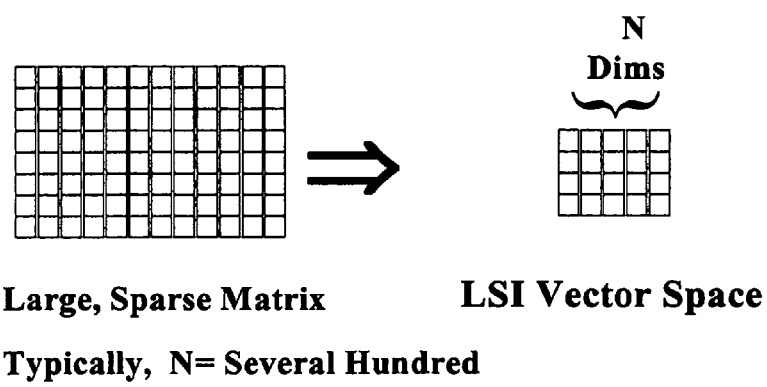
Large, Sparse Matrix   LSI Vector Space
Typically, N= Several Hundred
FIGURE 3 – Dimensionality Reduction

METHOD FOR DOCUMENT COMPARISON AND SELECTION

CROSS REFERENCE TO RELATED APPLICATIONS

This application claims benefit of, and hereby incorporates in its entirety, U.S. Provisional Patent Application No. 60/251,423 entitled Method for Document Comparison and Selection, and filed Dec. 6, 2000.

BACKGROUND OF THE INVENTION

Field of the Invention

The present invention relates generally to methods and systems for interrelating and retrieving data stored in a database or in computer files. More particularly, the present invention relates to enhanced methods for searching a collection of one or more documents for material of conceptual relatedness.

SUMMARY OF THE DISCLOSURE

In a wide variety of applications, it is useful to be able to compare documents based on their conceptual content. In such applications, it is particularly useful to have a metric whereby documents are ordered according to their degree of similarity. A further desirable capability is the ability to carry out such comparisons at the sub-document level, for example, at the level of document sections or paragraphs.

An example of this type of application is the analysis of patents. In this example, it is desired to compare a given document, such as a patent application, with a collection of documents, especially prior patents. In this case, it is desirable to know which existing patents are closest in conceptual content to the patent application. It is useful to be able to order these prior patents in terms of their degree of similarity to the application document. The application as an entirety and the previous patents as complete entities could be compared. It would be, however, very useful to be able to compare just the claims section of the application with the claims sections of the previous patents. Moreover, it would be useful to be able to compare individual claims from the application with individual claims from the earlier patents.

Other examples wherein the general capability to compare document and sub-document content would be useful are:

Proposal preparation Many companies make significant investments in the preparation of proposals in response to requests for proposals (RFPs) and similar solicitations, from both government and commercial customers. In general, it can be quite cost-effective to re-use materials that have been prepared in response to previous requests. The problem in most large companies lies in organizing and retrieving this information. It would be desirable to be able to start with an outline or initial draft of a proposal and effectively retrieve relevant information from previous proposals. Prior material of interest generally would range in size from a paragraph to a page, although in some cases, whole sections might be desired.

Research management In order to make effective use of R&D funds, it is desirable to know how a proposed effort relates to prior work. This might simply reflect a desire not to duplicate previous work. More generally, it could represent a desire to learn as much as possible from closely related previous work before engaging in a new research task. In this case, a detailed outline or a textual description of a proposed effort could be compared to previous patents, reports, technical literature, etc.

Legal brief development In preparing a legal brief it could be quite valuable to be able to draw from previous legal documents. In this case, the initial document could be either an outline or a draft of the brief. The documents to be compared with could be prior briefs, court decisions, laws, etc.

Document declassification The US Government currently is spending considerable effort to review and declassify documents that are more than 25 years old as well as specific collections of more recent documents. Although some documents can be declassified in batches, many of the documents must be individually reviewed. Typically, this involves a knowledgeable person reading the documents and redacting portions that still must be kept classified. This process is both time-consuming and subject to individual interpretation. Given a page to be redacted, it would be highly desirable to be able to retrieve the most similar page (or pages) that had previously been reviewed and redacted. Being able to see what decisions prior reviewers had made could expedite the overall process and would greatly aid in improving consistency of redaction. This also could act as an important element in on-the-job training for new redactors.

Current approaches to these tasks typically draw from the fields of text retrieval and text categorization. Both fields historically have made extensive use of concepts of document similarity. An overview of document similarity is presented in Korfhage, R., Information Storage and Retrieval, Section 5.7, Document Similarity, 125–133 (Wiley and Sons, 1997) [Khorfhage]. Khorfhage provides a mathematical definition of twelve document similarity measures that historically have been applied in these fields:

Venn Overlap;
Rectangular Distance;
Conditional Probability;
Vector Angle;
Arithmetic Mean;
Proportion of Overlap;
Probability Difference I;
Probability Difference II;
Linear Correlation;
Yule Coefficient of Colligation;
Yule Auxiliary Quantity; and
Index of Independence.

Collectively, these measures encompass the vast majority of previous efforts involving document similarity measures. All of these are statistical measures that compare the distribution of terms (words) in the documents to be compared. Each of these measures has its relative strengths and weaknesses. However, they share one fundamental weakness: they are based on the terms that actually appear in individual documents.

Several factors, the most important of which are synonymy and polysemy, limit the degree to which term co-occurrence corresponds to conceptual similarity. Synonymy refers to the fact that in all languages, multiple words have roughly similar meanings. In English, for example, most common nouns and verbs have at least a half-dozen common synonyms. Thus, two documents may discuss very similar topics but may differ significantly in the choice of terms employed. Polysemy refers to the fact that in all languages, many words have multiple meanings. For example, in English, the word "strike" can mean to swing at and miss (as in baseball), a labor action, a military action (as in "air strike"), to find (as in "strike oil"), to light (as in "strike a match"), etc. Due to the pervasive effects of synonymy and polysemy, the co-occurrence of words in two documents may not be a reliable indication that their conceptual content is similar. Similarly, the lack of co-occurrence may not be a reliable indicator that the documents are dissimilar in conceptual content.

In addition to approaches that treat words as atomic units, there are variations on the above document similarity measures that deal with character strings that do not necessarily correspond to words. These approaches typically emulate an n-gram type of approach. For example, U.S. Pat. No. 6,041,323 Information Search Method, Information Search Device, and Storage Medium for Storing an Information Search Program, to Kubota [Kubota], describes an information search method that employs character strings that may correspond to multiple words and fragments of words. A similarity measurement is used to rank documents in a result set. The approach employed provides a limited degree of generalization capability, but still relies heavily on closeness of specific word choices in the query and the documents to be searched.

U.S. Pat. No. 5,926,812, Document Extraction and Comparison Method with Applications to Personalized Automatic Database Searching, to Hilsenrath O., et al. [Hilsenrath], extends the word-level comparisons of the above techniques to include comparisons of clusters of words. Although providing some immunity from noise, e.g., accidental word combinations, it does not overcome the fundamental limitations of the above techniques.

Latent Semantic Indexing (LSI) offers an alternative approach to measuring the conceptual similarity between documents. The LSI technique starts with a collection of text passages, typically referred to in the literature as "documents". The term "document", however, in this case may refer to paragraphs, pages, or other subdivisions of text and not necessarily to documents in the usual sense (i.e., externally defined logical subdivisions of text). For simplicity, in this discussion we will follow the standard convention of referring to the text passages of interest as documents.

The basic technique is described in Deerwester, S., et al, Indexing by Latent Semantic Analysis, in Journal of the Society for Information Science, 41(6), 391407 (October, 1990) [Deerwester I] and in U.S. Pat. No. 4,839,853 Computer Information Retrieval Using Latent Semantic Structure, to Deerwester et al. [Deerwester I]. The optimality of this technique is shown in Ding, C., A Similarity-based Probability Model for Latent Semantic Indexing, in Proceedings of the 22nd Annual SIGIR Conference, (August, 1999) [Ding]. The LSI technique has been shown to be of considerable value as an approach to text retrieval in both Dumais, S., LSI meets TREC: A Status Report, in The First Text Retrieval Conference (TREC1), National Institute of Standards and Technology Special Publication #500-207, 137–152 (1993) [Dumais I] and Dumais, S., Using LSI for Information Filtering: TREC-3 Experiments, in The Third Text Retrieval Conference (TREC3) National Institute of Standards and Technology Special Publication #500-226, (1995) [Dumais II]. Each of the above is incorporated herein by reference.

The use of LSI is illustrated with reference to FIG. 1. As a preliminary step in using the LSI technique, a large sparse matrix (the T×D matrix) is formed. Each row in the T×D matrix corresponds to a term that appears in the documents of interest, and each column corresponds to a document. (While the discussion and claims herein relate rows to terms and columns to documents, it should be apparent to one skilled in the art that the alternate correspondence will also be effective.) Each element (m, n) in the matrix corresponds to the number of times that the word m occurs in document n. Referring to FIG. 2, the known technique of singular value decomposition (SVD) can be used to reduce the T×D matrix to a product of three matrices, including a matrix that has non-zero values only on the diagonal. Small values on this diagonal, and their corresponding rows and columns in the other two matrices are then deleted. This truncation process is used to generate a vector space of reduced dimensionality as illustrated in FIG. 3 by recombining the three truncated matrices in to (T×D) matrix. Both terms and documents are located at specific positions in this new vector space.

While it is preferable to index all documents of interest into the LSI space concurrently, another method, i.e., folding in, allows the position that a new document would have occupied in the LSI space had it been originally indexed to be estimated. For LSI in general, the result of an SVD operation is such that within the LSI space the vector position of an indexed document is the weighted average of the vector positions of the terms that appear in that document. To estimate the position that a new un-indexed document would have occupied had it been initially indexed, we determine the weighted average position of the terms found in the space that are also found in the new document.

The primary application of latent semantic indexing has been in the area of information retrieval. In this application, queries are treated as pseudo-documents. Documents are ranked in terms of similarity to the query based on a cosine measure between the vector corresponding to the query and the vector corresponding to that document. Numerous experiments have shown that closeness of documents in this sense is a good proxy for closeness in terms of information content. See Dumais I; Dumais II; Dumais, S., Latent Semantic Indexing (LSI) and TREC-2, in THE Second Text Retrieval Conference (TREC2), National Institute of Standards and Technology Special Publication #500-215, 105-116 (1994) [Dumais III].

The similarity measurement capability provided using LSI is fundamentally different from those provided by the types of measures listed in the summary section of this document. Quoting Dr. Thomas Landauer, one of the inventors of LSI: "It is important to note that the similarity estimates derived by LSA [latent semantic analysis, an alternative term for applying LSI] are not simple contiguity frequencies, co-occurrence counts, or correlations in usage, but depend on a powerful mathematical analysis that is capable of correctly inferring much deeper relations (thus the phrase "latent semantic"), and as a consequence are often much better predictors of human meaning-based judgments . . . "See Landauer, T., An Introduction to Latent Semantic Analysis, Discourse Processes, 259–284 (1998) [Landauer]. The SVD technique employed in LSI is a process of global constraint satisfaction that is inherently much more powerful than techniques that rely on term co-occurrence statistics.

The process of document comparison takes place within an LSI space. The documents to be compared against are indexed in an LSI space as described in Deerwester II. In creating the LSI space, the technique of Singular Value Decomposition is applied to a matrix of terms versus documents. The documents, however, do not necessarily have to correspond to full documents in the common sense of the word. Depending upon the application, the textual units (documents) that are used in constructing the space may be entire documents or may be paragraphs, pages, subsections, or other subdivisions of the text of the documents. The document to be compared to this collection of documents similarly may be treated at these various levels. The level of treatment of a document of interest and the level of treatment of documents within the collection of documents to be compared to do not need to be the same. For example, a document of interest might be treated as a whole while the documents to be compared to might be treated at the paragraph level. In this discussion, the term document should be considered in this more general context.

Once the matrix approximating the LSI space has been generated through SVD, the comparison process continues by mapping a document that is to be compared into the LSI space. A vector corresponding to this document (or document segment) is generated in the LSI space. This can be done easily for new documents due to a simple characteristic of the LSI space: In the LSI space, a document (or document segment) is located at the geometric average of the terms that it contains. The LSI vector corresponding to the document (or document segment) of interest is used as the basis for comparison. The degree of similarity of the documents in the collection to be compared against is determined by the cosine measure between the LSI vectors corresponding to those documents and this basis. This is a standard measure of similarity typically used in LSI retrieval applications.

As noted in Landauer, page 4, the similarity estimates derived through the process of latent semantic indexing are based on a powerful mathematical analysis (singular value decomposition and dimensionality reduction). This analysis is capable of inferring much deeper relations than statistical techniques that employ contiguity frequencies, co-occurrence counts, or correlations in usage. The dimensionality reduction combines surface information into a deeper abstraction that captures the mutual implications of words and text passages. This deeper level of abstraction is a critically important aspect of using LSI for estimating document similarity in comparison to prior approaches. A striking difference between use of LSI and prior approaches is that much of the information that the LSI technique employs in inferring relations among words and passages is derived from passages in which specific words do not appear. The LSI technique simultaneously takes into account information from all of the documents used in creating the LSI space. Uniquely, LSI can determine that two documents are closely related conceptually even though, due to the use of different synonyms in each document, they share few words.

While use of the LSI technique constitutes a very powerful approach to comparison of documents, there are, however, some limitations on the LSI technique. In the present invention, we extend the ability to perform comparisons in several ways, as described below, to mitigate the impact of these limitations. The present invention includes extensions to LSI for:

phrase processing;
creation of generalized entities;
elaboration of entities;
replacement of idiomatic expressions; and
use of data fusion methods to combine the aforementioned extensions in a synergistic fashion.

Additionally, this application discloses novel methods tailored to specific uses of LSI.

In a preferred embodiment, the invention includes a method for representing the latent semantic content of a collection of documents, where each document contains terms. The method includes deriving a phrase comprising at least one n-tuple term from the plurality of terms. A two-dimensional matrix is formed where each matrix column c corresponds to a document and each matrix row r corresponds to a term occurring in at least one document corresponding to a matrix column. Each matrix element (r, c) is related to the number of occurrences of the term corresponding to the row r in the document corresponding to column c. This relationship is typically direct, i.e., the number of occurrences of the term is entered in the matrix, but it can be a variety of relationships. For example, in many applications it is desirable to apply some type of weighting to the matrix elements. Such weighting typically is based on the frequency of occurrence of the individual terms. The weighting often is chosen to reflect the estimated value of the term from an informational perspective. For example, a term that appears very frequently in a document collection generally is estimated to have less information value than one that occurs less frequently. Accordingly, early experiments with LSI showed that log entropy is particularly effective in some text retrieval applications using LSI.

At least one matrix element is related to the number of occurrences of at least one n-tuple term occurring in at least one document. The latent semantic content of the collection is then represented by performing singular value decomposition and dimensionality reduction on the matrix to form a latent semantic indexed vector space.

In other embodiments, the invention includes a method for representing a query document where the query document is intended for querying a collection of reference documents via a latent semantic indexed representation of the reference collection. In those embodiments, the method includes identifying verbatim entities, where an entity is one or more verbatim terms. Identified entities are then stemmed and generalized, while retaining frequency information. The stemmed generalized entities can then either replace or supplement the corresponding verbatim entities. In a variation, the invention includes a method for characterizing the results of a query into a latent-semantic-indexed document space. The results typically include a set of document identities. The method includes ranking results as a function of at least the frequency of occurrence of at least one term. In a further variation, the both previous embodiments are combined, preferably in an iterative fashion.

In some embodiments, the present invention includes a method for representing the latent semantic content of a plurality of documents, where each document contains a plurality of verbatim terms. The method includes deriving at least one expansion phrase from the verbatim terms. One or more verbatim terms having a corresponding expansion phrase are replaced by the expansion phrase. A two-dimensional matrix is formed where each matrix column c corresponds to a document and each matrix row r corresponds to a term occurring in at least one document corresponding to a matrix column. Each matrix element (r, c) is related to the number of occurrences of the term corresponding to the row r in the document corresponding to column c. This relationship is typically direct, i.e., the number of occurrences of the term is entered in the matrix, but it can be a variety of relationships, e.g., As above, this typically involves use of a frequency-related term weighting, which can take into account both the frequencies of terms in individual documents as well as frequencies in the overall collection. At least one matrix element is related to the number of occurrences of at least one term occurring in the at least one expansion phrase. The latent semantic content of the collection is then represented by performing singular value decomposition and dimensionality reduction on the matrix to form a latent semantic indexed vector space.

In some embodiments, the present invention includes a method for representing the latent semantic content of a plurality of documents, where each document contains a plurality of verbatim terms, including idioms. The method includes identifying at least one idiom among the documents; each idiom containing at least one idiom term. A two-dimensional matrix is formed where each matrix column c corresponds to a document and each matrix row r corresponds to a term occurring in at least one document corresponding to a matrix column. Each matrix element (r, c) is related to the number of occurrences of the term corresponding to the row r in the document corresponding to column c. This relationship is typically direct, i.e., the number of occurrences of the term is entered in the matrix, but it can be a variety of relationships, e.g., these typically are chosen to reflect differential importance of terms from an information content perspective. At least one occurrence of at least one idiom term is excluded from the number of occurrences corresponding to that term in the matrix. The latent semantic content of the collection is then represented by performing singular value decomposition and dimensionality reduction on the matrix to form a latent semantic indexed vector space.

Although each of these extensions to the basic LSI technique is valuable in its own right, more effective application may be attained through combining their use. The techniques have the important virtue that they lend themselves to combination using current data fusion techniques. For details on such techniques see Proceedings of the Second International Conference on Information Fusion (FUSION'99), available from the International Society of Information Fusion, and GOODMAN, I., Mathematics of Data Fusion, Theory and Decision Library. Series B, Mathematical and Statistical Methods, Vol. 37, Kluwer Academic Publishers, 1997.

BRIEF DESCRIPTION OF THE DRAWINGS

FIG. 1 illustrates term by document matrix of the present application.

FIG. 2 illustrates singular value decomposition operation of the present application.

FIG. 3 illustrates dimensionality reduction of the present application.

DETAILED DESCRIPTION

Figure 4:
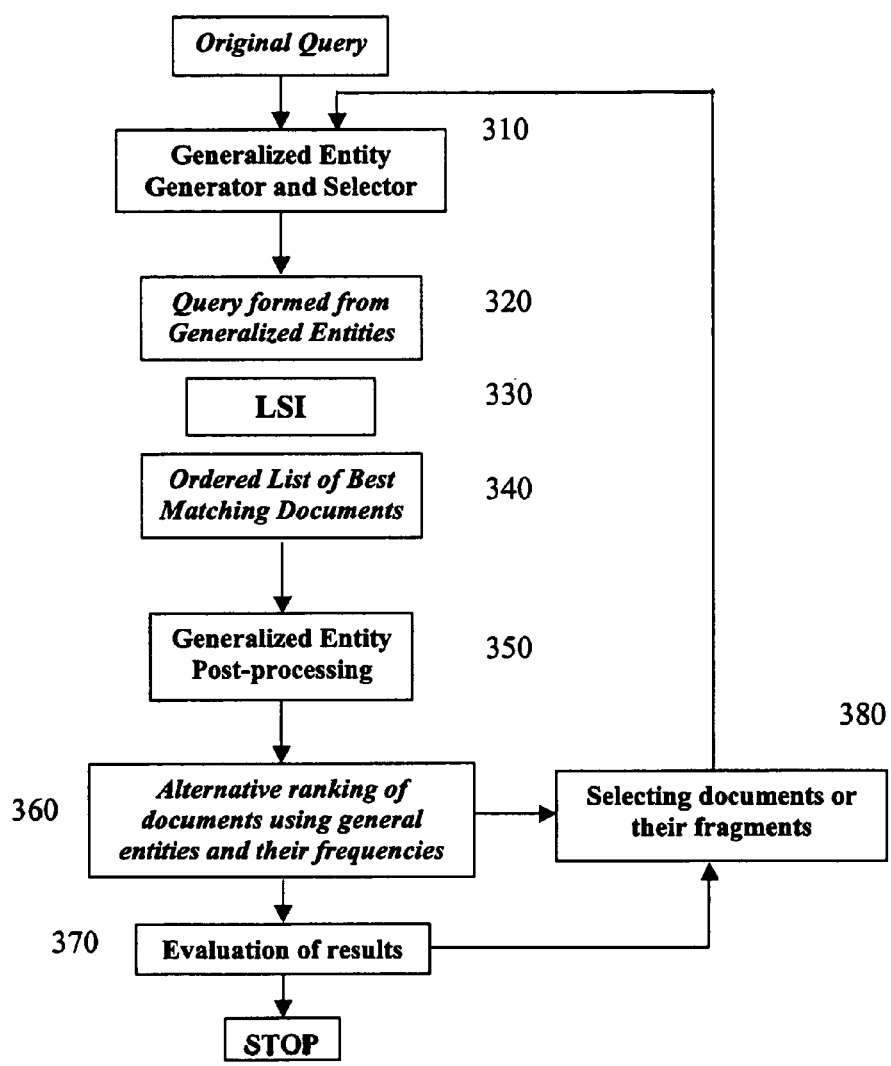
FIG. 4 illustrates interactive application of the present application.

One characteristic of the LSI technique is that it does not take into account term order. Each document is considered as a collection of unordered terms. It is known, however, that phrases, e.g., small groups of ordered terms, constitute an important element of semantic content. In preferred embodiments of this aspect of the present invention, the scope of processing is broadened to take into account the semantic contribution of phrases, also referred to herein as n-tuples. Most phrases of interest consist of only a few consecutive terms; typically two to four.

One method of identifying n-tuples is to consider n contiguous words in a document as an n-tuple. For example, consider the sentence "United States policies towards Cuba are changing." Automatically identifying n-tuples for n=2 from left to right would result in: "united*states", "states*policies", "policies*towards", "towards*cuba", "cuba*are", "are*changing". For n=3, the result would be: "united*states*policies", "states*policies*towards", "policies*towards*cuba", "towards*cuba*are", "cuba*are*changing". In most applications, it will not be necessary to continue beyond triplets or quadruplets of words.

In some embodiments, a list of phrases maintained external to the document space is used to identify phrases.

Once phrases have been identified, preferred embodiments of the invention may proceed in at least two ways. In a first way, a single LSI space combining single terms and n-tuples is formed. In another way, separate LSI spaces are formed; each space containing one set of n-tuples, e.g., an LSI space containing triples, another containing quadruples.

In some embodiments of the invention, a subset of identified n-tuples is indexed into the LSI space along with single terms. For example, consider the sentence "United States policies towards Cuba are changing." If only "united*states" was identified as a phrase form that sentence, then there would be one occurrence each of: "united", "states", "united*states", "policies", "towards", "cuba", "are", and "changing".

In other embodiments, it is preferable to count only occurrences of identified phrases and non-phrase words. For example, consider the sentence "United States policies towards Cuba are changing." If only "united*states" was identified as a phrase form that sentence, then there would be one occurrence each of: "united*states", "policies", "towards", "cuba", "are", and "changing". There would be no occurrences of "united" or "states" alone.

The approaches to identifying n-tuples disclosed herein can result in a great number of n-tuples; especially where n-tuples are identified automatically. However, embodiments of the invention include steps and means for managing the quantity of n-tuples. In one embodiment, only those n-tuples that occur more than once in the document space are indexed. Similarly, a threshold may be established where only n-tuples that occur at least as many times as the threshold are indexed into the LSI space. Setting such a threshold can reduce processing of accidental combinations of terms and bring in to focus what users typically think of as phrases.

As with other aspects of the invention, human input regarding which n-tuples to include in the LSI space can be helpful, but is not necessary.

Having carried out phrase indexing according to one of the techniques above, there are several variants in how the resulting information can be used in determining document similarity.

One approach is to treat terms and phrases on an equal footing. However, in many applications this will not yield optimal results. In general, the fact that two documents share a three-term or four-term tuple may be taken as stronger evidence of similarity than the fact that those same three terms or four terms appear separately at various points in both documents. Thus, co-occurrences of tuples should be given added weighting. For most applications, a simple linear or logarithmic weighting is appropriate. That is, $S_k = \alpha \cos\theta_{k1} + \beta \cos\theta_{k2} + \gamma \cos\theta_{k3} + \ldots$ where $S_k$ is the composite similarity measure between the kth document and the document of interest, $\theta_{kn}$ is the angle in the LSI space (or spaces) between the kth document and the document of interest as indexed using n-tuples of terms, and the $\alpha$, $\beta, \gamma, \ldots$ are heuristically determined coefficients. These coefficients typically will be normalized, for example by requiring that $I\alpha + \beta + \gamma + \ldots I = 1/N$, where N is the maximum number of contiguous words considered as a tuple. Numerous other weighting schemes may be employed depending upon the needs of a particular application. In general, it is best to determine the appropriate weights based on testing with a representative sample of documents.

With most methods for identifying n-tuples, interactive human input can be used to create n-tuples, and edit/delete n-tuples suggested by automatic means.

In document comparison systems it is useful to preprocess the document to be compared, i.e., the query document, and/or post-process the documents identified by LSI in order to emphasize relevance of the most prominent terms within the original query document. This objective typically is realized by assigning a relevance score based on term frequency and inverse document frequency. Terms from the query document that appear frequently in a given document and infrequently in other documents of a collection lead to higher relevancy scores for the given document. Document similarity measures such as the cosine similarity measure may utilize relevance scores by assigning weights to vector components (emphasizing components for terms that appear frequently in the given document or the query document but rarely appear in other documents of the collection to be compared against).

Generalized entity extension provides a different means of emphasizing term relevancy and query expansion. It is based on the premise that query document terms are more significant if they occur close together. In addition, secondary effects are obtained from explicitly excluding less relevant terms from the comparison query; therefore better focusing the topic of the query.

A generalized entity is a semantic unit that is a short phrase of one or more stemmed words (the original phrases may also be stored for querying databases that do not utilize stems). LSI indexing can be carried out either with or without stemming of words. Whether or not stemming should be applied in indexing an LSI space is application-specific. For example, applications wherein the documents of interest contain large numbers of foreign terms, particularly if they are highly inflected, may benefit from stemming. In addition, documents containing noise resulting from e.g., optical character recognition or speech recognition do typically benefit from stemming.

Generalized entities can be extracted from an original query (document or sub-document), or derived queries in an iterative querying mechanism (based on a set of top-ranking documents matching a query or a set of relevant documents selected by a user).

Generalized entities are created through extracting phrases between stop words, and stemming similar words. For example, the entity (retriev*text*) could be generated from any of the following phrases: retrieved textual, retrieving textual, or retrieved text. Stop words can be identified as those that have an inverse database frequency below some threshold. In a preferred embodiment of this invention, we use a combination of a stop word dictionary and simple expressions to define stop words. For example, [{A–Z}] describes words consisting of capital letters, [{0–9}] describes integer numbers. Generalized entities are assigned term frequencies for use in post-processing comparison results.

Once the generalized entities are constructed, a new query consisting of combined entities from the query document is submitted. The results returned by the LSI engine are post-processed using the generalized entities. Initially, since the LSI engine can return an arbitrary number of ranked documents, the generalized entities facilitate identifying the threshold between related and unrelated documents. Next, ranking of the related documents is adjusted to emphasize generalized entities with high term frequencies. This ranking adjustment is important because LSI engine results often are too general, i.e. words in terms are matched independently of each other: a given generalized entity may not be present in the document as a phrase but as single words that are used in different places of the document. The ranking adjustment evaluates such documents as being less relevant (similar to the query document) than those that contain complete generalized entities.

FIG. 4 illustrates a method of iteratively applying both post- and pre-processing of generalized entities. After generating and selecting 310 generalized entities, preferred embodiments of the invention form a query 320 from the selected generalized entities. Application of this query to an LSI space 330 returns a list 340 of documents best matching the query. The list is typically ordered by cosine measure of the closeness within the LSI space between each document on the list and the query vector.

In one embodiment of the invention, a subset of the documents indicated as closest to the query are post-processed 350 to produce an alternative ranking 360. In preferred embodiments, the alternative ranking is based on the aggregate number of occurrences of query terms found in the document. In the illustrated method, results of this ranking are evaluated 370; either manually by a user or in comparison to some objective criteria. Both the ranking and result evaluation can be used to select documents 380 or portions thereof to serve as the basis for another iteration of the process.

Generalized entity extension provides a means for emphasizing term relevancy and query expansion in an efficient and effective way. In contrast to the phrase processing extension, application of generalized entities does not require pre-processing or LSI re-indexing of the document database. Generalized entities can be implemented solely in the post-indexing phase. Depending on the application, generalized entity processing can be applied both to the query document and to the documents to be compared with, or only to the documents to be compared with. The generalized entity extension technique described here also extends the reach of the LSI technique in document comparison. Although it has many similarities with the phrase extension technique, they are not the same. Depending upon the application, use of one or the other may be preferable. In addition, the two techniques can be combined. Generalized entity extension can be used with existing LSI software without requiring extensive change to that software. There is no need for a separate LSI space. The technique makes no restrictions on the word combinations that occur, and thus can be applied to arbitrary subject matter. The technique can be implemented as an automated process and does not impose requirements for additional external resources such as dictionaries, etc.

It is often the case that the terminology employed to express a given meaning in one area of discourse is not the same as that used to denote the same meaning in another area. This situation will artificially lower the degree of similarity of documents in these areas as estimated through use of the LSI technique (or any other technique). Similarly, the use of acronyms, abbreviations, code names, and various types of aliases will reduce the estimated similarity. In applications where use of such terms is frequent, it can be useful to compensate for this effect.

The entity elaboration technique of the present invention provides a unique and valuable approach for dealing with the variations in terminology in different subject areas. The technique is quite general in nature and can be applied in a fully automated manner. It does require additional resources, namely one or more subject matter dictionaries. This, however, is a minor constraint, as large numbers of machine-readable dictionaries are currently available. Many such dictionaries are free and can be downloaded from the Internet. For example, Specialized Dictionaries 2000, yourDictionary.com http://www.yourdictionary.com/diction4.html [Accessed 12 Sep. 2000] provides links to hundreds of such dictionaries.

In preferred embodiments of the present invention, verbatim terms are replaced with one or more terms, i.e., expansion phrases, expressing their meaning. For example, one method of accomplishing this is to expand acronyms when they are encountered and to substitute common names where these are known. For many applications, this process can be automated. In general, the intent is to normalize the terminology employed in describing concepts that constitute an equivalence class.

Another means of counteracting the terminology problem is to make use of subject-specific dictionaries. Substituting the definitions of specialized terms for the terms themselves has the effect of normalizing the vocabulary. For example, consider a case where documents in the field of signal processing are to be compared to documents in the field of information retrieval. At a fundamental level, these fields actually have much in common. This fact is masked, however, by the fact that quite different terminology has developed over time in both fields. For example, the concepts of probability of detection and false alarm rate in signal processing are equivalent to the ideas of recall and precision in information retrieval. (Recall corresponds to probability of detection and precision corresponds to one minus the probability of false alarm). In applying standard LSI techniques to estimating similarity among documents in these fields, the true similarity tends to be masked by such differences in terminology. There are, however, numerous machine-readable dictionaries available in both fields. In order to uncover the masked similarity, both sets of documents may be processed using the respective dictionaries applicable to their content.

In applying this approach, specialized terms in the signal processing papers are replaced with the definitions of those terms from the dictionary of signal processing (more generally, electronic) terms. Specialized terms in the information retrieval papers are replaced with their definitions as given in a dictionary of information retrieval (more generally, information science) terms. When these expanded documents are indexed in the LSI space, the similarity measure between their respective vectors increases. The expanded documents can be used for indexing and determining proximity. In so doing, only the occurrence of words is of importance. The dictionaries do not have to be comprehensive and the substitutions do not have to produce readable sentences. Use of this approach can be valuable when comparing documents across disciplines. A comparison system using this technique can be of value in discovering new relations among work in different areas. This is of particular value in investigations related to intellectual property.

In addition to words and phrases, other types of items occurring within the documents of interest could be expanded. For example, symbolic mathematical operators could be replaced with a corresponding name or textual description. Similarly, chemical structural formulas could be replaced with chemical names. Graphic objects such as figures and tables could be replaced with meaningful (descriptive) text equivalents. More complex objects such as audio and video segments also could be treated in this manner.

English, along with other languages, contains expressions for which a literal interpretation does not convey the correct meaning. Idioms, figures of speech, formulaic phrases, colloquialisms, etc., are widely used in both formal and informal discourse. For simplicity, in the following discussion, we will use the term idiom to refer to all such constructs. Contemporary English encompasses approximately 10,000 such constructs that are commonly encountered. See, The American Heritage Dictionary of Idioms, (Ammer, C., ed., 1997) [Ammer]. The occurrences of these expressions in a set of documents collectively reduce the accuracy of the LSI technique (as well as all other document comparison and retrieval mechanisms). A benefit of the LSI technique is derived from the mathematical analyses that are employed (singular value decomposition and dimensionality reduction). These analyses extract information about the relations between terms and the text passages in which they occur. The accuracy with which these relations are derived fundamentally affects how well the LSI method performs in any context.

Idioms act as noise, reducing the effectiveness of the LSI technique. For example, a document in a given subject area may contain the idiom "good as gold." The mathematical analyses of the LSI technique will attempt to establish relations with text passages that talk about gold coins, gold medals, gold mines, etc. In a large collection of text, many thousands of idioms will appear. These have the overall effect of decreasing the accuracy of the relations extracted in the LSI processing.

A solution to this problem is to process the idioms before applying the LSI indexing procedure. One simple approach would be to simply ignore all idioms in the processing, i.e., treat them in the same way that stop words are treated. A better way to process them would be to replace each idiom with a word or phrase that describes what is meant by the idiom. This preserves the meaning of the idioms in the context of the text passages in which they occur. Identifying idioms in text is straightforward, as they consist of readily recognizable sets of contiguous words, with some minor and easily characterized variations. There are large collections of idioms that can be used as the basis for such processing. See Ammer. Examples of appropriate replacements are shown in TABLE 1.

TABLE 1

Example Idioms and Replacements

| IDIOM | REPLACEMENT |
| --- | --- |
| bring to light | reveal |
| damn with faint praise | compliment feebly |
| good as gold | reliable |
| great guns | energetically |
| In the pink | healthy |
| live down | overcome |
| point the finger at | blame |
| run to earth | find |
| shed light on | clarify |
| shoot the breeze | chat |
| spitting image | precise resemblance |
| tick off | make angry |

A point to note is that, because of the way LSI works, these substitutions do not have to yield correctly formed English sentences. In addition, it is not critical that nuances of meaning be captured. Improvement results primarily from replacing the words that have other contexts (such as "gold" in "good as gold") with words that can be interpreted literally. In fact, there can be cases where the replacement turns out to be incorrect. As long as the majority of the replacements are correct, however, the overall effect will be beneficial. Finally, the replacement does not have to be comprehensive.

Most idioms can be replaced in the simple fashion noted above. In a full implementation of this technique, there are some cases where the replacement is not as simple. For example, the phrase "black hole" has a technical meaning in astronomy (a singularity in space-time due to a large concentration of mass) as well as an idiomatic meaning (a general area from which information is not obtained). In general, such cases can be readily discerned from context. Some idioms may have variable components; such as "rap one's knuckles". In this case, "one's" may correspond to "his", "her", "their", or a person's name. Such special cases can be dealt with using simple parsing techniques. The frequency of occurrence of these cases is sufficiently low that they can be ignored and still allow the technique to be practiced effectively.

Each of the above techniques used in isolation can improve document matching. Even greater improvement generally can be obtained from using the techniques in combination. In so doing, there will be multiple choices as to what entities to index in the LSI space, which indexed entities should be treated separately in performing comparisons, and even how many LSI indexes to create. In addition, as was the case in phrase processing above, there will be choices as to how the results from applying the different techniques should be combined. For any given application, certain combinations of indexing and weighting choices will perform better than others. In general, effective combinations and weights should be determined heuristically. Some overall heuristics may be determined initially that are applicable to a wide variety of document comparison problems. Others should be determined for a specific application based on testing using a representative sample of documents. The array of techniques developed in modern work on data fusion is applicable here.

As an application of the present invention, we may consider patent analysis. Given a patent or patent application or draft of interest, it is desirable to determine what existing patents are comparable in conceptual content. Moreover, it is desirable to be able to rank other patents in terms of their degree of conceptual similarity to the patent (or application, or draft) of interest. An LSI space is created using the full text of the patents to be compared to. This could correspond to the entire collection of patents that exist in full text or to some subdivision such as the collection of patents in a specific class or set of classes. At the completion of the LSI indexing, every patent will have a corresponding vector in the space. In addition, (except for words that are treated as stop words) every word that occurs in the patent collection will have a corresponding vector in this space. The text of the patent (or application or draft) of interest is then used to create a new vector in this LSI space. This is done through linear combination of the vectors corresponding to the words that occur in the patent of interest. (Unique words that occur in the patent of interest but not in the overall collection may be ignored). The patent of the comparison collection whose LSI vector is closest to this new vector (i.e., has the largest cosine measure between it and the new vector) is ranked as the conceptually most similar patent. The patent whose LSI vector is next closest to the new vector is ranked as the next most conceptually similar patent.

Continuing in this fashion, all patents in the comparison collection could be ranked in terms of their conceptual similarity to the patent (or application or draft) of interest. In practice, it typically will be sufficient to consider the nearest N patents for some integer N. The process as just described treats patents as whole documents. In the case of patents, however, there are logical subdivisions of the documents that can be used as the basis for specific comparisons. For example, the claims section may be treated as a logical unit for comparison. The claims section of the patent (or application or draft) of interest might be compared against the claims sections of the patents in the comparison collection. This type of comparison would be most applicable in terms of evaluating potential for infringement. The claims section of the patent (or application or draft) of interest also might be compared against the description section of the patents. This would have particular applicability to searching for prior art. Individual claims also could be used as a basis for comparison.

As noted above, the techniques described here can improve the performance of LSI in more general applications than the document comparison activities concentrated on here. Essentially most applications of LSI can benefit from application of these techniques. In particular, use of LSI in information retrieval applications where the query is generated by a user (as opposed to using a document or document element as a query) can be enhanced through use of the techniques described above. Similarly, cross-lingual retrieval and document routing are candidates for use of LSI enhanced by these techniques.

One aspect of the LSI technique is that it is independent of language. This property has been used in cross-lingual information retrieval. See U.S. Pat. No. 5,301,109 Computerized Cross-language Document Retrieval Using Latent Semantic Indexing, to Landauer et al. In such applications, LSI has the unique ability to retrieve documents in multiple languages and correctly interleave them in order of relevance without requiring translation either of the query or of the documents. LSI is unique in this respect. Other approaches to cross-lingual information retrieval typically require translation of either the queries or the documents or both. The phrase extension and entity extension techniques of the present invention also are independent of language and can be used in this cross-lingual manner. Thus, the present invention has the characteristic that it can be readily used to compare documents in multiple languages without employing tactics common to current approaches. As in the case of the information retrieval applications of LSI, cross-language document comparisons using the present invention do not require translation of the document of interest or of any of the documents to be compared with.

For any given application, a combination of the techniques described above can be anticipated to yield improved document similarity estimates in comparison to the use of a single approach. The techniques of the present invention, although not completely independent, do complement each other in important ways. The use of data fusion techniques to combine the outputs of the individual approaches thus constitutes a useful, novel, and nonobvious extension of the invention.

The entity elaboration technique of the present invention also can be used in a multi-lingual environment. It does require that appropriate specialty dictionaries be available in each of the languages that are to be dealt with. (Note: the requirement here is only for monolingual specialty dictionaries, not bilingual ones.) Such dictionaries are becoming readily available on the Internet for a wide variety of languages and topics. Once the dictionary has been applied to expand the terms in the documents, the processing proceeds using the basic LSI techniques. This preserves the unique cross-lingual aspects of the LSI technique. Similarly, in employing the idiom replacement extension, once the idioms are replaced with literal substitutes, the subsequent processing preserves the cross-lingual capabilities of LSI.

An example of the value of this capability can be seen in the case of patent analysis. A given input document (proposed research task description, draft patent, draft claims, etc.) could be compared to patents in multiple languages. The present invention would return a list of the closest "documents" to be compared against (individual claims, claim sections, entire patents). This list would include documents in each of the languages of the database, correctly ordered in terms of their conceptual similarity to the input document. This could be very valuable in determining whether to pursue a given research task or to file a patent application. By focusing attention on documents of high relevance, use of this invention can help in making more effective use of expensive translation assets.

Basing the comparison techniques on the LSI method allows an even greater degree of generality. The "documents" that are compared actually can be significantly more general objects. In fact, they can be any set of objects that can be represented by a collection of character strings. The "documents" dealt with, both as items of interest and items to be compared against, can be, for example, collections of documents as opposed to individual documents. The objects that are dealt with can even be surrogates for non-textual objects, such as images or protein sequences. A particularly interesting example is where the surrogate objects represent some aspect of people, such as user interests or areas of expertise. In a research management application, for example, the comparison capabilities described in this invention could be used to route incoming documents to people with related interests and/or expertise. In a patent examination application, the techniques of this invention could be used to route a patent application to an examiner with the most relevant expertise. The collective sets of patents processed by individual examiners could represent objects in the LSI space. A new application could be automatically assigned to the examiner whose history of examined patents most closely matched the conceptual content of the new application.

While the present invention makes use of the properties of the LSI vector space to explicitly compare documents, it should be noted that the use of the specific vector space generated using the LSI technique is not essential. A person skilled in the art could make use of slightly different vector space representations of the documents. However, it has been demonstrated that the LSI space is an optimal semantic subspace based on maximum likelihood estimation. [Ding].

It should be recognized that various preferred embodiments and characteristics thereof that have been described are merely illustrative of the principles of this invention. Numerous modifications and adaptations thereof will be readily apparent to those skilled in the art without departing from the spirit and scope of the present invention.

The invention claimed is:

1. A computer-based method for representing latent semantic content of a plurality of documents, each document containing a plurality of terms, the method comprising:
   identifying at least one idiom among the documents, each idiom containing at least one idiom term;
   replacing at least one identified idiom with a corresponding idiom elaboration, each elaboration comprising at least one elaboration term,
   forming a two-dimensional matrix,
   each matrix column corresponding to a document;
   each matrix row corresponding to a term;
   each matrix element representing a number of occurrences of the term corresponding to the element's row in the document corresponding to element's column,
   at least one matrix element corresponding to the number of occurrences of an elaboration term in a document corresponding to a matrix column;
   performing singular value decomposition and dimensionality reduction on the matrix to form a reduced matrix and storing the reduced matrix in an electronic form accessible to a user.

2. A computer-based method for representing latent semantic content of a plurality of documents, each document containing a plurality of terms, the method comprising:
   identifying at least one idiom among the documents, each idiom containing at least one idiom term;
   forming a two-dimensional matrix,
   each matrix column corresponding to a document;
   each matrix row corresponding to a term occurring in at least one document represented by a row;
   each matrix element representing a number of occurrences of the term corresponding to the element's row in the document corresponding to element's column;
   at least one occurrence of at least one idiom term being excluded from the number of occurrences corresponding to that term in the matrix,
   performing singular value decomposition and dimensionality reduction on the matrix to form a reduced matrix and storing the reduced matrix in an electronic form accessible to a user.

3. A computer-based method for representing latent semantic content of a plurality of documents, each document containing a plurality of verbatim terms, the method comprising:
   deriving at least one expansion phrase from the verbatim terms, each expansion phrase comprising terms;
   replacing at least one occurrence of a verbatim term having an expansion phrase with the expansion phrase corresponding to that verbatim term;
   forming a two-dimensional matrix,
   each matrix column c corresponding to a document;
   each matrix row r corresponding to a term;
   each matrix element (r, c) representing a number of occurrences of the term corresponding to r in the document corresponding to c;
   at least one matrix element corresponding to the number of occurrences of at least one term occurring in the at least one expansion phrase, and
   performing singular value decomposition and dimensionality reduction on the matrix to form a latent semantic indexed vector space and storing the latent semantic indexed vector space in an electronic form accessible to a user.

4. A computer-based method for determining conceptual similarity between a subject document and at least one of a plurality of reference documents, each reference document containing a plurality of terms, the method comprising:
   deriving at least one n-tuple term from the plurality of terms;
   forming a plurality of two-dimensional matrices wherein, for each matrix:
   each matrix column c corresponds to a document, wherein one column corresponds to the subject document and the remaining columns correspond to the reference documents;

each matrix row r corresponds to a term occurring in at least one of the subject document or the reference documents, each matrix element (r, c) represents a number of occurrences of the term corresponding to r in the document corresponding to c;

performing singular value decomposition and dimensionality reduction on the plurality of formed matrices, to form a plurality of latent semantic indexed vector spaces, the plurality of latent semantic indexed vector spaces including at least one space formed from a matrix including at least one element corresponding to the number of occurrences of at least one n-tuple term in at least one document, determining at least one composite similarity measure between the subject document and the at least one reference document as a function of a weighted similarity measure of the subject document to the at least one reference document in each of the plurality of indexed vector spaces and storing the at least one composite similarity measure in an electric form accessible to a user.

5. The method as recited in claim 4 wherein determining the at least one composite similarity measure comprises weighing similarity measures from vector spaces comprising greater numbers of n-tuples greater than similarity measures from vector spaces comprising lesser numbers of n-tuples.

6. A computer-based method for characterizing results of a query comprising:

automatically identifying n-tuples included in a collection of documents based on an analysis of the collection of documents, wherein each document in the collection of documents contains a plurality of terms;

forming a latent semantic indexed vector space based on (i) the documents in the collection of documents, (ii) the plurality of terms, and (iii) the automatically identified n-tuples;

querying the latest semantic indexed vector space with a query having at least one term;

ranking results of the querying step as a function of at least a frequency of occurrence of the at least one term, thereby generating a characterization of the results; and storing the characterization in an electronic form accessible to a user.

7. The method as recited in claim 6 wherein at least one term used in ranking is a query term.

8. The method as recited in claim 7 wherein the at least one query term used in ranking is a generalized entity.

9. The method as recited in claim 6 wherein the at least one term used in ranking is a generalized entity.

10. A computer-based method for representing latent semantic content of a plurality of documents, each document containing a plurality of terms, the method comprising:

deriving at least one n-tuple term from the plurality of terms;

forming a two-dimensional matrix, each matrix column c corresponding to a document, each matrix row r corresponding to a term occurring in at least one document corresponding to a matrix column, each matrix element (r, c) related to a number of occurrences of the term corresponding to the row r in the document corresponding to column c, at least one matrix element related to the number of occurrences of the at least one n-tuple term occurring in the at least one document, and performing singular value decomposition and dimensionality reduction on the matrix to form a latent semantic indexed vector space and storing the latent semantic indexed vector space in an electric form accessible to a user.

11. The computer-based method as recited in claim 10 further comprising:

identifying an occurrence threshold;

wherein n-tuples that appear less times in the document collection than the occurrence threshold are not included as elements of the matrix.

12. The computer-based method as recited in claim 11 wherein the occurrence threshold is two.

13. The computer-based method as recited in claim 10 wherein deriving at least one n-tuple term further comprises:

creating the at least one n-tuple term from n consecutive verbatim terms.

* * * * *